(12) United States Patent
Okabayashi et al.

(10) Patent No.: US 8,177,042 B2
(45) Date of Patent: May 15, 2012

(54) ROTARY DAMPER

(75) Inventors: Shunsuke Okabayashi, Sagamihara (JP); Ken Hayashi, Toyota (JP)

(73) Assignee: Nifco Inc., Kanagawa (JP)

( * ) Notice: Subject to any disclaimer, the term of this patent is extended or adjusted under 35 U.S.C. 154(b) by 701 days.

(21) Appl. No.: 12/225,772

(22) PCT Filed: Mar. 27, 2007

(86) PCT No.: PCT/JP2007/057346
§ 371 (c)(1),
(2), (4) Date: Dec. 23, 2008

(87) PCT Pub. No.: WO2007/114408
PCT Pub. Date: Oct. 11, 2007

(65) Prior Publication Data
US 2010/0175957 A1    Jul. 15, 2010

(30) Foreign Application Priority Data

Mar. 29, 2006 (JP) ................. P2006-092497
Dec. 27, 2006 (JP) ................. P2006-351897

(51) Int. Cl.
*F16D 57/02* (2006.01)
(52) U.S. Cl. .................. 188/293; 188/290; 188/83
(58) Field of Classification Search .............. 188/82.1, 188/83, 290, 293, 296
See application file for complete search history.

(56) References Cited

U.S. PATENT DOCUMENTS

| | | | |
|---|---|---|---|
| 4,618,039 A * | 10/1986 | Omata | 188/268 |
| 5,211,267 A | 5/1993 | Clark | |
| 2006/0011428 A1 * | 1/2006 | Hayashi et al. | 188/290 |
| 2006/0207844 A1 * | 9/2006 | Koizumi et al. | 188/290 |

FOREIGN PATENT DOCUMENTS

| | | |
|---|---|---|
| CN | 1721728 | 1/2006 |
| DE | 10 2005 032 112 | 2/2006 |
| GB | 2 416 198 | 1/2006 |
| JP | 63167136 A * | 7/1988 |

(Continued)

OTHER PUBLICATIONS

China Patent & Trademark Office, Chinese Office Action issued in corresponding Chinese Patent Application No. 200780020379.0 and mailed Dec. 11, 2009—13 pages.

*Primary Examiner* — Thomas J Williams
(74) *Attorney, Agent, or Firm* — Hamre, Schumann, Mueller & Larson, P.C.

(57) ABSTRACT

In a rotary damper capable of being easily assembled by reducing the remaining air inside an accommodation portion and reducing the non-uniformity of damping torque, a center shaft 73 is provided in the center of a fixing and supporting member 71, an inner cylinder wall 63 into which the center shaft 73 is inserted rotatably is provided in a driven rotation member 61, an O ring 81 which prevents the leakage of viscous fluid 101 from between the driven rotation member 61 and the fixing and supporting member 71 is provided, a first path 70 which enables the accommodation portion 91 to communicate with its outside is provided between the center shaft 73 and an inner circumference face of the inner cylinder wall 63, and a hole 63c which allows the bottom side of the O ring 81 inside the accommodation portion 91 to communicate with the first path 70 is provided in the driven rotation member 61.

22 Claims, 8 Drawing Sheets

FOREIGN PATENT DOCUMENTS

| | | |
|---|---|---|
| JP | 1-37236 | 11/1989 |
| JP | 5-44760 | 2/1993 |
| JP | 2519149 | 9/1996 |
| JP | 10-306836 | 11/1998 |
| JP | 11-30261 | 2/1999 |
| JP | 2603574 | 1/2000 |
| JP | 3421484 | 4/2003 |
| JP | 2004-52822 | 2/2004 |
| JP | 2006-52830 | 2/2006 |
| WO | WO 2005028911 A1 * | 3/2005 |

* cited by examiner

ROTARY DAMPER

TECHNICAL FIELD

The present invention relates to a rotary damper for damping the relative rotation of a driven rotation member and a fixing and supporting member which holds the driven rotation member to be freely rotatable by using viscous resistance of a viscous fluid.

BACKGROUND ART

There is a known rotary damper including a driven rotation member integrally formed with a rotation portion such as a gear or a rack which is engaged with a driving member, a fixing and supporting member which holds the driven rotation member rotatably, an accommodation portion, for example, in the shape of a circle, which is formed between the fixing and supporting member and the driven rotation member, a sealing member which seals an end of an outer circumference of the accommodation portion, so that the driven rotation member and the fixing and supporting member can be relatively rotated, and a viscous fluid which is stored in the accommodation portion and damps the relative rotation of the driven rotation member and the fixing and supporting member (for example, see Patent Document 1).

The rotary damper includes an opening (hole), which enables the accommodation portion to communicate with the atmosphere, in the center of the fixing and supporting member. The rotary damper prevents air from being collected in the accommodation portion at a time when the driven rotation member and the fixing and supporting member are assembled for easy assembly and prevents air from being mixed in the viscous liquid for maintaining the precision of torque.

However, since there is not a preventive plan for the leakage of the viscous liquid from the opening (hole), that is, the opening (hole) is not closed, when the rotary damper is used at a high temperature, the viscous liquid may leak from the opening (hole).

Thus, a rotary damper in which an opening (hole) which enables an accommodation portion to communicate with the atmosphere is not provided is proposed with consideration of the leakage of the viscous fluid from the opening (hole) (for example, see Patent Documents 2 to 5).

In addition, a rotary damper having a concave portion in which a convex portion of a casing fits at the center of the lower side and an air discharge path, one side of which is open for the concave portion of a rotation body and the other side of which is open for an outer circumference face of the rotation body in the rotation body rotatably disposed inside the casing filled with the viscous fluid is proposed (for example, see Patent Document 6).

Patent Document 1: Japanese Registered Utility Model No. 2603574
Patent Document 2: Japanese Examined Utility Model Registration Application Publication No. 1-37236
Patent Document 3: Japanese Patent No. 3421484
Patent Document 4: Japanese Registered Utility Model No. 2519149
Patent Document 5: Japanese Unexamined Patent Application Publication No. 11-30261
Patent Document 6: Japanese Unexamined Patent Application Publication No. 10-306836

However, when an opening (hole) which enables an accommodation portion to communicate with the atmosphere is not provided, with consideration of the leakage of the viscous fluid from the opening (hole), air is collected in the accommodation portion to make the assembly inconvenient, the air is mixed in the viscous liquid to make the damping torque non-uniform, and the precision of the torque becomes not constant (non-uniformity of the damping torque occurs).

In addition, in the rotary damper disclosed in Patent Document 6, although the air which is collected in the concave portion of the rotation body at a time when the rotation body is attached can be discharged through the air discharge path, when a capping member is attached after the attachment of the rotation body, air is trapped in the casing by the capping member.

When the air is trapped in the casing as described above, the damping torque becomes non-uniform, and the precision of the torque becomes not constant.

DISCLOSURE OF THE INVENTION

The present invention is contrived to solve the above-described problems and provides a rotary damper capable of being easily assembled by decreasing the remaining air in the accommodation portion and reducing the non-uniformity of damping torque (keeping the precision of the torque constant).

The present invention is as follows.

(1). A rotary damper comprising:
a driven rotation member that is integrally formed with a rotation portion engagable with a driving member;
a fixing and supporting member that holds the driven rotation member rotatably;
an accommodation portion that is defined between the fixing and supporting member and the driven rotation member, and
a viscous fluid that is stored in the accommodation portion and damps a relative rotation of the driven rotation member and the fixing and supporting member, wherein
a seal member that seals an outer circumference of the accommodation portion to allow the driven rotation member and the fixing and supporting member to relatively rotate is provided,
an opening that enables a portion located more inside than the seal member of the accommodation portion with atmosphere is provided in at least one of the driven rotation member and the fixing and supporting member, and
the opening is closed so as not to obstruct the relative rotation of the driven rotation member and the fixing and supporting member when or after the driven rotation member and the fixing and supporting member are assembled.

(2). The rotary damper described in (1), wherein a closing means for closing the opening is a welding of an opening located in the front end of the driven rotation member.

(3). The rotary damper described in (1) or (2), wherein a gap regulating portion for regulating a gap in a direction of a rotation shaft around which the driven rotation member and the fixing and supporting member relatively rotate when the driven rotation member and the fixing and supporting member are assembled is provided in one of the driven rotation member and the fixing and supporting member.

(4) The rotary damper described in (3), wherein
a center shaft is provided in a center of the fixing and supporting member,
a cylinder-shaped portion having the opening into which the center shaft is inserted is provided in the driven rotation member, and
a welding regulating portion for regulating contacting a melted portion of the cylinder-shaped portion to the center shaft is provided in the cylinder-shaped portion.

(5) The rotary damper described in (4), wherein the welding regulating portion additionally serves as the gap regulating portion.

(6) The rotary damper described in any one of (1) to (5), wherein a center shaft is provided in the center of the fixing and supporting member, a cylinder-shaped portion having the opening into which the center shaft is inserted is provided in the driven rotation member, and a complementary engaging portion for regulating an displacement of the driven rotation member and the fixing and supporting member in a direction of a rotation shaft around which the driven rotation member and the fixing and supporting member relatively rotate and allowing the driven rotation member and the fixing and supporting member to relatively rotate is provided between an inner circumference of the cylinder-shaped portion and an outer circumference of the center shaft.

(7). The rotary damper described in any one of (1) to (5), wherein an engaging portion for regulating an displacement of the driven rotation member and the fixing and supporting member in a direction of a rotation shaft around which the driven rotation member and the fixing and supporting member relatively rotate and allowing the driven rotation member and the fixing and supporting member to relatively rotate is provided in an outer portion of the driven rotation member and the fixing and supporting member.

(8) A rotary damper comprising:

a driven rotation member integrally formed with a rotation portion engagable with a driving member;

a fixing and supporting member that holds the driven rotation member rotatably;

an accommodation portion that is defined between the fixing and supporting member and the driven rotation member, and a viscous fluid that is stored in the accommodation portion and damps a relative rotation of the driven rotation member and the fixing and supporting member, wherein a center shaft is provided in the center of the fixing and supporting member, a hole into which the center shaft is rotatably inserted is provided in the driven rotation member, a seal member that prevents a leakage of the viscous fluid from a portion between the driven rotation member and the fixing and supporting member is provided, a first path through which the accommodation portion communicates with an outside is provided between the center shaft and a surrounding face forming the hole, and a second path that allows a bottom side of the seal member inside the accommodation portion to communicate with the first path is provided in the driven rotation member.

(9). A rotary damper comprising:

a driven rotation member integrally formed with a rotation portion engagable with a driving member;

a fixing and supporting member that holds the driven rotation member rotatably;

an accommodation portion that is defined between the fixing and supporting member and the driven rotation member, and a viscous fluid that is stored in the accommodation portion and damps a relative rotation of the driven rotation member and the fixing and supporting member, wherein a center shaft is provided in a center of the fixing and supporting member, a hole into which the center shaft is rotatably inserted is provided in the driven rotation member, a seal member that prevents a leakage of the viscous fluid from a portion between the driven rotation member and the fixing and supporting member is provided, a first path through which the accommodation portion communicates with an outside is provided between the driven rotation member and the fixing and supporting member, and a constriction portion is provided in the first path.

(10) The rotary damper described in (9), wherein a plurality of the constriction portions are provided in the first path in a direction that the viscous fluid flows.

(11). The rotary damper described in (9) or (10), wherein an upper wall face forming the first path is an upward inclining face.

(12) A rotary damper comprising:

a driven rotation member integrally formed with a rotation portion engagable with a driving member;

a fixing and supporting member that holds the driven rotation member rotatably;

an accommodation portion that is defined between the fixing and supporting member and the driven rotation member, and a viscous fluid that is stored in the accommodation portion and damps the relative rotation of the driven rotation member and the fixing and supporting member, wherein a center shaft is provided in a center of the fixing and supporting member, a hole into which the center shaft is rotatably inserted is provided in the driven rotation member, a seal member which prevents a leakage of the viscous fluid from a portion between the driven rotation member and the fixing and supporting member is provided, and a first path that allows an outside of the accommodation portion and a bottom side of the seal member inside the accommodation portion to communicate with each other is provided in the center shaft.

(13). The rotary damper described in any one of (8) to (12), wherein the first path is closed after the driven rotation member and the fixing and supporting member are assembled.

(14). A rotary damper comprising:

a first member;

a second member that holds the first member rotatably;

an accommodation portion that is defined between the first member and the second member;

a viscous fluid that is stored in the accommodation portion and damps a rotation of the first member with respect to the second member;

a seal member that seals the accommodation portion from atmosphere in a state where the first member is rotatable with respect to the second member; and a close portion that is provided in at least one of the first member and the second member, and is formed by closing an aperture, which communicates the accommodation portion with atmosphere during assembly processing of the first member and the second member.

(15). The rotary damper according to (14), wherein the aperture is provided at a front end of the first member.

(16). The rotary damper according to (15), wherein the close portion is formed by welding the aperture provided at a front end of the first member.

(17). The rotary damper according to (15), wherein the close portion is formed by assembling the first member and the second member.

(18). The rotary damper according to (14), wherein the aperture is provided at a bottom of the second member.

(19) The rotary damper according to (18), wherein the close portion is formed by welding the aperture provided at a bottom of the second member.

(20). The rotary damper according to any one of (14) to (19), wherein at least one of the first member and the second member includes a gap regulating portion for regulating a gap in a direction of a rotation shaft around which the first member rotates with respect to the second member when the first member and the second member are assembled.

(21). The rotary damper according to any one of (14) to (16), wherein the second member includes a center shaft, the first member includes a cylinder-shaped portion having a hollow portion into which the center shaft is inserted, and having a welding regulating portion for regulating contacting a melted portion of the cylinder-shaped portion to the center shaft.

(22). The rotary damper according to (21), wherein the welding regulating portion additionally serves as the gap regulating portion.

(23). The rotary damper according to any one of (14) to (21), wherein the second member includes a center shaft, the first member includes a cylinder-shaped portion having a hollow portion into which the center shaft is inserted, and wherein a complementary engaging portion for regulating an displacement of the first member and the second member in a direction of a rotation shaft around which the first member rotates with respect to the second member and allowing the first member to rotate with respect to the second member is provided between an inner circumference of the cylinder-shaped portion and an outer circumference of the center shaft.

(24). The rotary damper according to any one of (14) to (21), wherein at least one of the first member and the second member includes a claw portion for regulating an displacement of the first member and the second member in a direction of a rotation shaft around which the first member rotates with respect to the second member and allowing the first member to rotate with respect to the second member.

(25). The rotary damper according to any one of (14) to (24), wherein the second member includes a center shaft, the first member includes a cylinder-shaped portion having a hollow portion into which the center shaft is inserted, and wherein a first path through which the accommodation portion communicates with the close portion is provided between the center shaft and the cylinder-shaped portion.

(26). The rotary damper according to (25), wherein the first member includes a second path that allows a bottom side of the seal member inside the accommodation portion to communicate with the first path.

(27). The rotary damper according to any one of (14) to (24), wherein a third path through which the accommodation portion communicates with the close portion is provided between the first member and the second member, and a constriction portion is provided in the third path.

(28). The rotary damper according to (27), wherein a plurality of the constriction portions are provided in the third path in a direction that the viscous fluid flows.

(29). The rotary damper according to (27) or (28), wherein an upper wall face forming the third path is an upward inclining face.

(30). The rotary damper according to any one of (14) to (24), wherein the second member includes a center shaft, the first member includes a cylinder-shaped portion having a hollow portion into which the center shaft is inserted, and wherein a fourth path that allows a bottom side of the seal member inside the accommodation portion and close portion to communicate with each other is provided in the center shaft.

According to (1) of the invention, since an opening which enables a portion located more inside than the seal member of the accommodation portion to communicate with the atmosphere is provided in at least one of the driven rotation member and the fixing and supporting member and the opening is closed not to obstruct the relative rotation of the driven rotation member and the fixing and supporting member when or after the driven rotation member and the fixing and supporting member are assembled, the air remaining inside the accommodation portion is decreased to make the assembly easy, the air mixed in the viscous fluid is decreased to maintain the precision of the torque constant, and the closing operation of the opening is not required additionally to improve the efficiency of the assembly.

According to (2) of the invention, since a closing means for closing the opening is welding of an opening located in the front end of the driven rotation member, the opening can be closed assuredly to prevent the leakage of the viscous fluid from the opening.

According to (3) of the invention, a gap regulating portion for regulating a gap in a direction of a rotation shaft around which the driven rotation member and the fixing and supporting member relatively rotate is provided in one of the driven rotation member and the fixing and supporting member when the driven rotation member and the fixing and supporting member are assembled, the gap between the driven rotation member and the fixing and supporting member is not changed to be able to maintain the precision of the torque constant.

According to (4) of the invention, since a center shaft is provided in a center of the fixing and supporting member, a cylinder-shaped portion having the opening into which the center shaft is inserted is provided in the driven rotation member, and a welding regulating portion for regulating contacting of the melted cylinder-shaped portion to the center shaft is provided in the cylinder-shaped portion, the attachment of the melt cylinder-shaped portion to the center shaft can be prevented to be able to assuredly rotate the driven rotation member and the fixing and the supporting member.

According to (5) of the invention, since the welding regulating portion additionally serves as the gap regulating portion, one component can have two functions, and accordingly, the configuration can be made simple compared with its function.

According to (6) of the invention, since a complementary engaging portion for regulating the displacement of the driven rotation member and the fixing and supporting member in a direction of a rotation shaft around which the driven rotation member and the fixing and supporting member relatively rotate and allowing the driven rotation member and the fixing and supporting member to relatively rotate is provided between an inner circumference of the cylinder-shaped portion and an outer circumference of the center shaft, it becomes difficult for the driven rotation member to be released from the fixing and supporting member, the driven rotation member and the fixing and supporting member can be formed using two face separation molding although a slider is used, and since the contacting portion between the driven rotation member and the fixing and supporting member contacts a center portion which has a small contacting area, a frictional resistance between the driven rotation member and the fixing and supporting member is reduced, and the frictional resistance between the driven rotation member and the fixing and supporting member is reduced further by interposing the viscous liquid between the driven rotation member and the fixing and supporting member.

According to (7) of the invention, since an engaging portion for regulating the displacement of the driven rotation member and the fixing and supporting member in a direction of a rotation shaft around which the driven rotation member and the fixing and supporting member relatively rotate and allowing the driven rotation member and the fixing and supporting member to relatively rotate is provided in an outer portion of the driven rotation member and the fixing and supporting member, the driven rotation member and the fixing and supporting member can be molded using two face separation molding although a slider is used.

According to (8) of the invention, since a first path through which the accommodation portion communicates with its outside is provided between the center shaft and a surrounding face forming the hole and a second path which allows a bottom of the seal member inside the accommodation portion to communicate with the first path is provided in the driven rotation member, the air located in the bottom side of the seal member inside the accommodation portion in which the atmosphere can be easily collected can be discharged outside of the accommodation portion through the second path and the first path.

Accordingly, the remaining air inside the accommodation portion is decreased to reduce the non-uniformity of the damping torque.

According to (9) of the invention, since a first path through which the accommodation portion communicates with its outside is provided between the driven rotation member and the fixing and supporting member and a constriction portion is provided in the first path, the speed of the viscous liquid moving through the first path is reduced by the constriction portion, and the moving speed of the air becomes relatively fast with respect to that of the viscous fluid, and accordingly, it becomes easy to discharge the atmosphere outside the accommodation portion.

Thus, the amount of the remaining air in the accommodation portion is decreased, thereby reducing the non-uniformity of the damping torque.

According to (10) of the invention, since a plurality of the constriction portions are provided in the first path in a direction that the viscous fluid flows, the speed of the viscous liquid moving through the first path is reduced further by the plurality of constriction portions, and accordingly, the air can be more easily discharged outside the accommodation portion by further increasing the relative moving speed of the atmosphere with respect to that of the viscous fluid.

Accordingly, the non-uniformity of the damping torque can be reduced more by further decreasing the remaining air inside the accommodation portion.

According to (11) of the invention, since an upper wall side forming the first path is an upward inclining side, the air is lifted along the top face, and accordingly, it becomes much easier to discharge the air outside the accommodation portion.

Accordingly, the non-uniformity of damping torque can be reduced much more by even further decreasing the remaining air inside the accommodation portion.

According to (12) of the invention, since a first path which allows the outside of the accommodation portion and the bottom side of the seal member inside the accommodation portion to communicate with each other is provided in the center shaft, the air located in the bottom side of the seal member inside the accommodation portion in which the atmosphere can be easily collected can be discharged outside of the accommodation portion through the first path.

Accordingly, the non-uniformity of damping torque can be reduced by decreasing the remaining air inside the accommodation portion.

According to (13) of the invention, since the first path is closed after it is assembled, an outlet of the viscous liquid is removed, and accordingly, the leakage of the viscous liquid outside the accommodation portion can be prevented.

According to (14) of the invention, an aperture, which communicates the accommodation portion with atmosphere during assembly processing of the first member and the second member, is provided in at least one of the first member (driven rotation member) and the second member (fixing and supporting member) and the aperture is closed thereby forming the close portion. Thus the air remaining inside the accommodation portion is decreased to make the assembly easy, the air mixed in the viscous fluid is decreased to maintain the precision of the torque constant.

According to (15) to (19) of the invention, the air remaining inside the accommodation portion is decreased to make the assembly easy, the air mixed in the viscous fluid is decreased to maintain the precision of the torque constant.

According to (20) of the invention, the gap between the first member and the second member is not changed to be able to maintain the precision of the torque constant.

According to (21) of the invention, the attachment of the melt cylinder-shaped portion to the center shaft can be prevented to be able to assuredly rotate the first member with respect to the second member.

According to (22) of the invention, one component can have two functions, and accordingly, the configuration can be made simple compared with its function.

According to (23) of the invention, it becomes difficult for the first member to be released from the second member, the first member and the second member can be formed using two face separation molding although a slider is used, and since the contacting portion between the first member and the second member contacts a center portion which has a small contacting area, a frictional resistance between the first member and the second member is reduced, and the frictional resistance between the first member and the second member is reduced further by interposing the viscous liquid between the first member and the second member.

According to (24) of the invention, the first member and the second member can be molded using two face separation molding although a slider is used.

According to (25) and (26) of the invention, since a first path through which the accommodation portion communicates with the close portion is provided between the center shaft and the cylinder-shaped portion and a second path that allows a bottom side of the seal member inside the accommodation portion to communicate with the first path is provided in the first member, the air located in the bottom side of the seal member inside the accommodation portion in which the atmosphere can be easily collected can be discharged outside of the accommodation portion through the second path and the first path.

Accordingly, the remaining air inside the accommodation portion is decreased to reduce the non-uniformity of the damping torque.

According to (27) of the invention, since a first path through which the accommodation portion communicates with its outside is provided between the first member and the second member and a constriction portion is provided in the third path, the speed of the viscous liquid moving through the third path is reduced by the constriction portion, and the moving speed of the air becomes relatively fast with respect to that of the viscous fluid, and accordingly, it becomes easy to discharge the atmosphere outside the accommodation portion.

Thus, the amount of the remaining air in the accommodation portion is decreased, thereby reducing the non-uniformity of the damping torque.

According to (28) of the invention, since a plurality of the constriction portions are provided in the third path in a direction that the viscous fluid flows, the speed of the viscous liquid moving through the third path is reduced further by the plurality of constriction portions, and accordingly, the air can be more easily discharged outside the accommodation portion by further increasing the relative moving speed of the atmosphere with respect to that of the viscous fluid.

Accordingly, the non-uniformity of the damping torque can be reduced more by further decreasing the remaining air inside the accommodation portion.

According to (29) of the invention, since an upper wall side forming the third path is an upward inclining side, the air is lifted along the top face, and accordingly, it becomes much easier to discharge the air outside the accommodation portion.

Accordingly, the non-uniformity of damping torque can be reduced much more by even further decreasing the remaining air inside the accommodation portion.

According to (30) of the invention, since a fourth path that allows a bottom side of the seal member inside the accommodation portion and close portion to communicate with each other is provided in the center shaft, the air located in the bottom side of the seal member inside the accommodation portion in which the atmosphere can be easily collected can be discharged outside of the accommodation portion through the first path.

Accordingly, the non-uniformity of damping torque can be reduced by decreasing the remaining air inside the accommodation portion.

BEST MODE FOR CARRYING OUT THE INVENTION

Hereinafter, embodiments of the present invention will be described with reference to the accompanying drawings.

Figure 1:
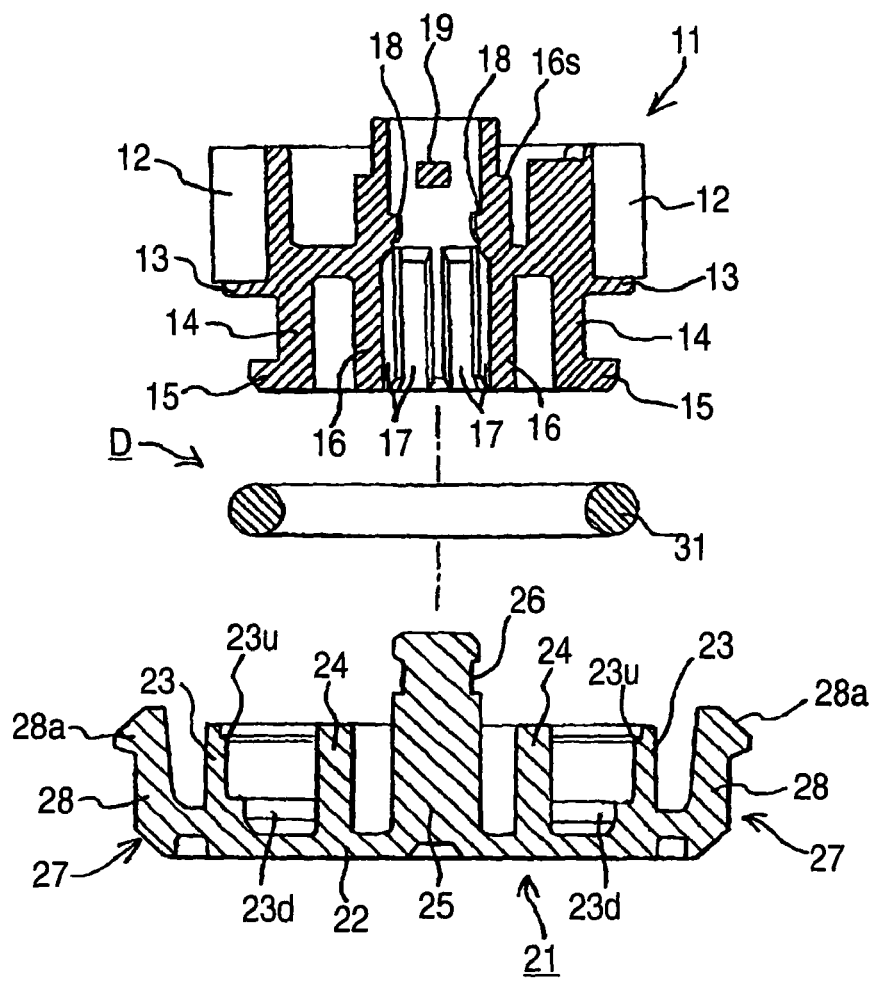
FIG. 1 is an exploded front sectional view of a rotary damper according to a first embodiment of the present invention.
Figure 2:
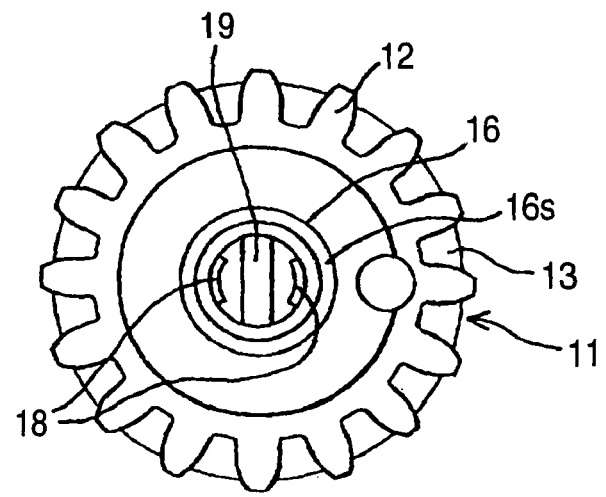
FIG. 2 is a plan view of a driven rotation member shown in FIG. 1.
Figure 3:
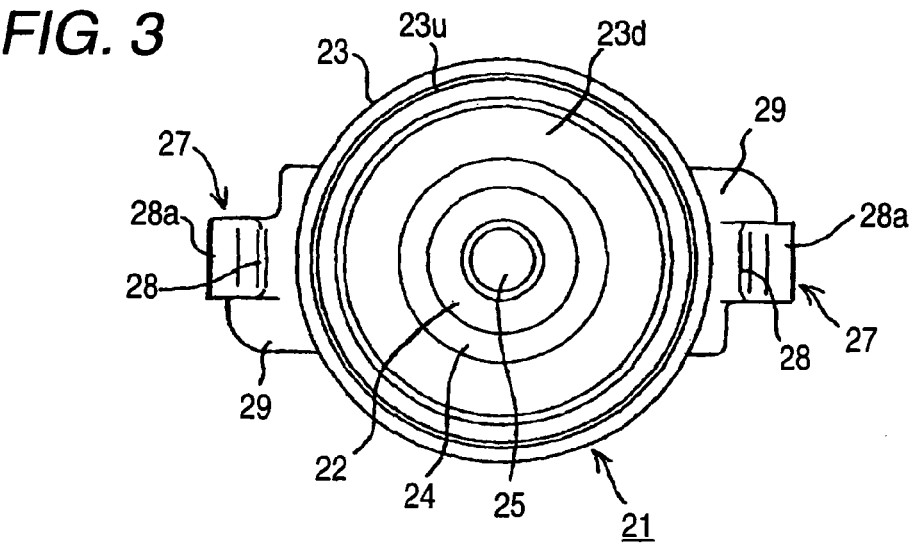
FIG. 3 is a plan view of a fixing and supporting member shown in FIG. 1.
Figure 4:
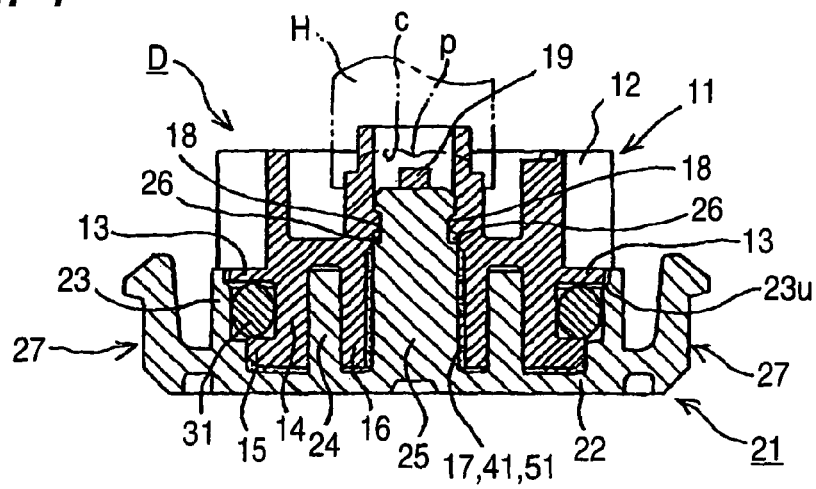
FIG. 4 is a front sectional view of a rotary damper during a fabrication process of attaching components shown in FIG. 1.
Figure 5:
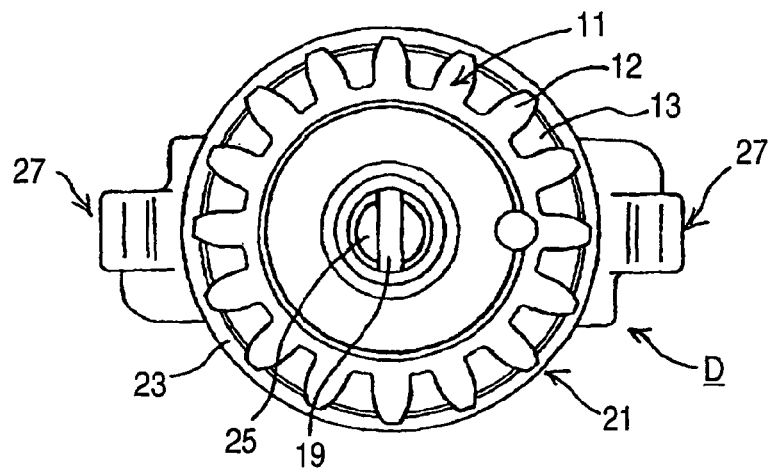
FIG. 5 is a plan view of a rotary damper during a fabrication process of attaching components shown in FIG. 1.
Figure 6:
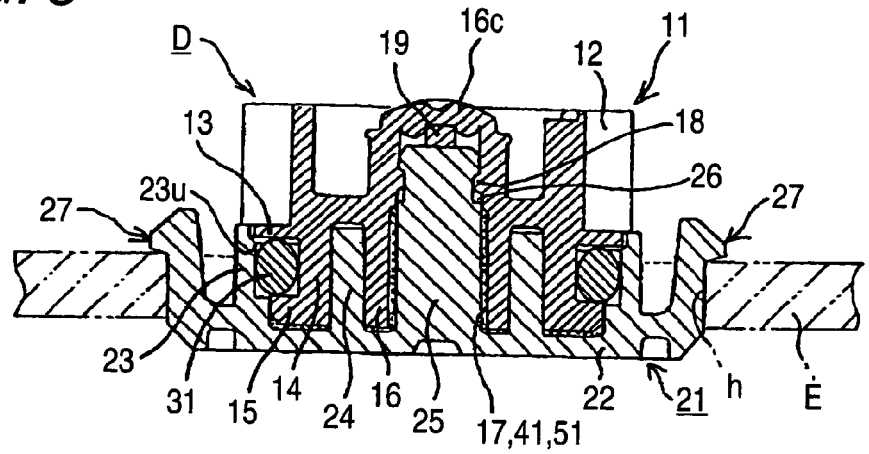
FIG. 6 is a front sectional view of a rotary damper which is fabricated by attaching components shown in FIG. 1 and is attached to an attachment target member.

FIG. 1 is an exploded front sectional view of a rotary damper according to a first embodiment of the present invention. FIG. 2 is a plan view of a driven rotation member shown in FIG. 1. FIG. 3 is a plan view of a fixing and supporting member shown in FIG. 1. FIG. 4 is a front sectional view of a rotary damper during a fabrication process of attaching components shown in FIG. 1. FIG. 5 is a plan view of a rotary damper during a fabrication process of attaching the components shown in FIG. 1. FIG. 6 is a front sectional view of the rotary damper which is fabricated by attaching the components shown in FIG. 1 and is attached to an attachment target member.

In FIG. 1, a reference sign D denotes the rotary damper. The rotary damper includes a driven rotation member (first member) 11 made of a synthetic resin, a fixing and supporting member (second member) 21 made of the synthetic resin and called a housing which supports the driven rotation member 11 to be freely rotatable, an O ring 31 which is attached to the driven rotation member 11 and suitably formed of a silicon rubber, EPDM (ethylene propylene diene rubber), or the like as a sealing member sealing an outer circumference end of a circular accommodation portion 41 (see FIG. 4 or 6) which is defined between the driven rotation member 11 and the fixing and supporting member 21 while allowing relative rotation of the driven rotation member 11 and the fixing and supporting member 21, and a viscous fluid 51 (see FIG. 4 or FIG. 6) such as grease, silicon oil, or the like which is stored in the accommodation portion 41 (see FIG. 4 or FIG. 6) defined between the driven rotation member 11 and the fixing and supporting member 21 and damps the relative rotation of the driven rotation member 11 and the fixing and supporting member 21.

The driven rotation member 11 includes a gear portion 12 (also see FIG. 2) as a rotation portion which is engaged with a driving member such as a gear or a rack, a holding flange portion 13 which is provided under the gear portion 12 as one structure, an outer cylinder wall 14 which has the center of the gear portion 12 as its center and is provided under the holding flange portion 13 as one structure, and a holding flange portion 15 which is formed in a lower end of an outer circumference of the outer cylinder wall 14 as one structure to face the holding flange portion 13 and holds the O ring 31 in the outer circumference of the outer cylinder wall 14 by using the holding flange portion 13. Further an inner cylinder wall 16 which has the center of the gear portion 12 as a center, has an opening having a hallow portion communicating between the upper and lower sides in the inside of the outer cylinder wall 14, and communicating with the accommodation portion 41 is provided in the driven rotation member 11 as one structure, and a front end (upper end) of inner cylinder wall 16 is opened so as to form an aperture.

A revolving stair portion 16s is provided in an upper end of the outer circumference of the inner cylinder wall 16.

In addition, in an inner circumference of the inner cylinder wall 16, for example, six grooves 17 which is disposed at equal distances of 60 degrees and which vertically extend from a lower end of the inner circumference to about a center portion is provided. In addition, engaging protrusions 18 (see FIG. 2) which are disposed in an upper side of the grooves 17, and form a complementary engaging portion which can be relatively rotated with respect to a lock rotation groove 26 of the fixing and supporting member 21 to be described later are provided. In the engaging protrusions 18, an upper end is formed to be planar and a lower side extends outward in a downward direction. As an example, the engaging protrusions are disposed at intervals of 180 degrees therebetween. A welding regulating portion 19 (See also FIG. 2) locates over upper sides of the engaging protrusions 18 as one structure, and serves as a gap regulation portion for regulating a gap in a rotation shaft around which the driven rotation member 11 and the fixing and supporting member 21 rotate relatively when the driven rotation member 11 and the fixing and supporting member 21 are assembled and additionally regulating contacting a close portion 16c (see FIG. 6) which is formed by solidification of an upper end portion of a melted inner cylinder wall 16 to a center shaft 25 of the fixing and supporting member 21 as described later when the upper end portion of the inner cylinder wall 16 is welded for closing the upper end portion of the melted inner cylinder wall 16.

Chamfer processes are performed in a lower end of an outer circumference of the holding flange portion 15 and in a lower end of an inner circumference of the inner cylinder wall 16.

The fixing and supporting member 21 is provided with a base wall 22 (see FIG. 3) having a planar circular shape, an outer cylinder wall 23 (see FIG. 3) provided in an outer edge of the base wall 22 as one structure, an inner cylinder wall 24 (see FIG. 3) which is concentric with the case wall 22 and inserted into a circular groove formed by the outer cylinder wall 14 of the driven rotation member 11 and the inner cylinder wall 16, a center shaft 25 (see FIG. 3 also) which is formed in the center of the base wall 22 as one body and is inserted into the inner cylinder wall 16 of the driven rotation member 11, and an attachment portion 27 (see FIG. 3) which is formed, for example, at intervals of 180 degrees, in one body.

A lower end portion 23d which can accommodate the holding flange portion 15 of the driven rotation member 11 rotatably in its inside is formed in a lower end of the inner side of the outer cylinder wall 23, and an upper stair portion 23u which can accommodate the holding flange portion 13 of the driven rotation member 11 rotatably in its inside is formed in an upper end of the inner side of the outer cylinder wall 23.

A chamfer process is performed on an upper end of an outer circumference of the center shaft 25, and a lock rotation groove 26 having a flat upper end which forms a complementary regulating portion that can be rotated relatively with respect to the engaging protrusion 18 of the driven rotation member 11 is formed on the outer circumference at a height corresponding to the engaging protrusion 18 of the driven rotation member 11.

The attachment portion 27 extends outward from the base portion 22 and then extends upward. The attachment portion 27 includes a holding piece 28 having a holding claw 28a on an upper end of its outside and an holding protrusion 29 (See FIG. 3) extending outward from the base portion 22 and having a gap of an attachment target member, for example, an attached plate E (see FIG. 6), which is held between the holding protrusion 29 and the holding claw 28a.

In FIG. 4, a reference sign H denotes a heat tip as a welding jig. A concave portion c which forms a part of a sphere accepting an upper side of the inner cylinder wall 16 of the driven rotation member 11 is formed in the lower end of the hit tip, and a protrusion p is formed in the center of the concave portion c.

Next, an example of assembly of the rotary damper D will be described.

At first, as shown in FIG. 1, a fixing and supporting member 21 is put on a workbench and a predetermined amount of a viscous fluid 51 is injected into a circular concave portion formed by an outer cylinder wall 23 and an inner cylinder wall 24.

The lower side of the driven rotation member 11 in which the O ring 31 is held in an outside of the outer cylinder wall 14 by the holding flange portions 13 and 15 is inserted into the fixing and supporting member 21 using the insertion of the center shaft 25 into the inner cylinder wall 16 as a guide.

As described above, when the bottom of the driven rotation member 11 is inserted into the fixing and supporting member 21, the viscous fluid 51 and air are compressed by the driven rotation member 11 and the fixing and supporting member 21 to move a space between the driven rotation member 11 and the fixing and supporting member 21 from outside to inside. Then, the viscous fluid and air go into a space between the inner cylinder wall 16 and the center shaft 25 passing through the groove 17.

Since the air moves faster than the viscous fluid 51, air does not remain in the accommodation portion 41 which is formed by the driven rotation member 11 and the fixing and supporting member 21.

As described above, when the bottom of the driven rotation member 11 is inserted into the fixing and supporting member 21, the holding flange portion 15, as shown in FIG. 4, is inserted rotatably into the inside of the outer cylinder wall 23, and the O ring 31 seals between the outer cylinder wall 23 and the outer cylinder wall 14 while allowing the driven rotation member 11 and the fixing and supporting member 21 to be relatively rotatable.

The center shaft 25, as shown in FIG. 4, is placed inside the inner cylinder wall 16, and when the center shaft 25 goes through the engaging protrusion 18 to collide with the welding regulating portion 19, the engaging protrusion 18 is inserted into the lock rotation groove 26, and the engaging protrusion 18, as shown in FIG. 4, is engaged with the lock rotation groove 26.

As shown in FIG. 4, the heat tip H is heated by flowing a current in a status that the driven rotation member 11 is assembled to the fixing and supporting member 21, an upper end (aperture) of the inner cylinder wall 16 is welded to be closed by placing the upper end portion of the inner cylinder wall 16 in the concave portion c of the heat tip H as indicated by the alternate long and two short dashes line and pressing the heat tip down, and then, the heat tip is cooled and removed, and thereby the rotary damper D in a status shown in FIG. 6 is acquired. Then, the assembly is completed.

Next, an example of the attachment of the rotary damper D will be described.

As shown in FIG. 6, the rotary damper D is attached to the attached plate E by pinching the attachment plate E between the holding claw 28a and the holding protrusion 29 using a hole which is provided in the attachment plate E, that is a hole having the same circular shape as the bottom wall 22 of the fixing and supporting member 21 and having a notch into which the attachment portion 27 can be inserted at opposing positions of an outer circumference at 180 degrees.

Next, the operation of the rotary damper will be described.

At first, when the driven rotation member 11 is rotated by the rotation of the gear portion 12 which is interlocked with a gear, a rack, or the like, the rotation of the driven rotation member 11 is damped by a viscous resistance and a shearing resistance of the viscous fluid 51 interposed between the driven rotation member 11 and the fixing and supporting member 21.

Accordingly, the gear portion 12 of the driven rotation member 11 damps the rotation or movement of the gear, the rack, or the like which is interlocked with the driven rotation member, so that the gear, the rack, or the like is slowly rotated or moved.

As described above, according to a first embodiment of the present invention, since the inner cylinder wall 16 (opening) which enables a center portion of the accommodation portion 41 to communicate with the atmosphere is provided in the driven rotation member 11 and the inner cylinder wall 16 (opening) is closed not to obstruct the relative rotation of the driven rotation member 11 and the fixing and supporting member 21 after the driven rotation member 11 and the fixing and supporting member 21 are assembled, the remaining air in the accommodation portion 41 is decreased. Accordingly, it becomes easy to assemble the driven rotation member 11 and the fixing and supporting member 21, and the precision of the torque can be maintained constantly by decreasing the amount of the air that is mixed in the viscous fluid 51.

In addition, since the closing means which closes the inner cylinder wall 16 (opening) is welding of the upper end (front end opening portion, closing member) of the inner cylinder wall 16, the inner cylinder wall 16 (opening) can be closed assuredly without preparing an additional closing member, and accordingly, the leakage of the viscous fluid 51 from the inner cylinder wall 16 (opening) can be prevented.

When the driven rotation member 11 and the fixing and supporting member 21 are assembled, since the gap regulating portion (welding regulating portion 19) which regulates a gap between the driven rotation member 11 and the fixing and supporting member in a direction of the rotation shaft around which the driven rotation member 11 and the fixing and supporting member 21 relatively rotates is provided to the driven rotation member 11, the gap between the driven rotation member 11 and the fixing and supporting member 21 is not changed, and accordingly the precision of the torque can be maintained constantly.

Since the center shaft 25 is provided in a center of the fixing and supporting member 21, the inner cylinder wall 16 (cylinder-shaped portion) having the opening into which the center shaft 25 is inserted is provided in the driven rotation member 11, and the welding regulating portion 19 which regulates the contacting of an upper end portion of the welded inner cylinder wall 16 to the center shaft 25 is provided in the inner cylinder wall 16, the attachment of the upper end of the welded inner cylinder wall 16 to the center shaft 25 can be prevented, and accordingly, the driven rotation member 11 and the fixing and supporting member 21 can be assuredly rotated.

In addition, since the welding regulating portion 19 serves as a gap regulating portion additionally, two functions can be implemented in one component, and accordingly, the structure can be made simple compared with its functions.

The complimentary engaging portion (engaging portion 18 and engaging rotation groove 26) which regulates the movement in a direction of a shaft around which the driven rotation member 11 and the fixing and supporting member 21 relatively rotate and serves as an engaging portion which allows the driven rotation member 11 and the fixing and supporting member 21 to relatively rotate is provided between an inner circumference of the inner cylinder wall 16 and an outer circumference of the center shaft 25, it becomes difficult for the driven rotation member 11 to be released from the fixing and supporting member 21, and the driven rotation member 11 and the fixing and supporting member 21 can be formed using two face separation molding although a slider is used. In addition, since the contacting portion between the driven rotation member 11 and the fixing and supporting member 21 contacts a center portion which has a small contacting area, a frictional resistance between the driven rotation member 11 and the fixing and supporting member 21 is reduced, and the frictional resistance between the driven rotation member 11 and the fixing and supporting member 21 is reduced further by interposing the viscous liquid 51 between the driven rotation member 11 and the fixing and supporting member 21.

In addition, since the holding flange portion 15 is provided in the outer cylinder wall 14, the O ring 31 is not released from the outer cylinder wall 14, and accordingly, the assembly operation can be performed efficiently.

In addition, since the groove 17 is provided in the inner circumference of the inner cylinder wall 16, the air inside the accommodation portion 41 is discharged along the groove 17 from the inner cylinder wall 16 and the viscous liquid 51 is inserted between the inner cylinder wall 16 and the inner cylinder wall 24 along the groove 17, the remaining air inside the accommodation portion 41 further decreases, and accordingly, the assembly becomes more easy, and the air mixed in the viscous liquid 51 further reduces, and accordingly, the precision of the torque can be maintained more constantly.

Figure 7:
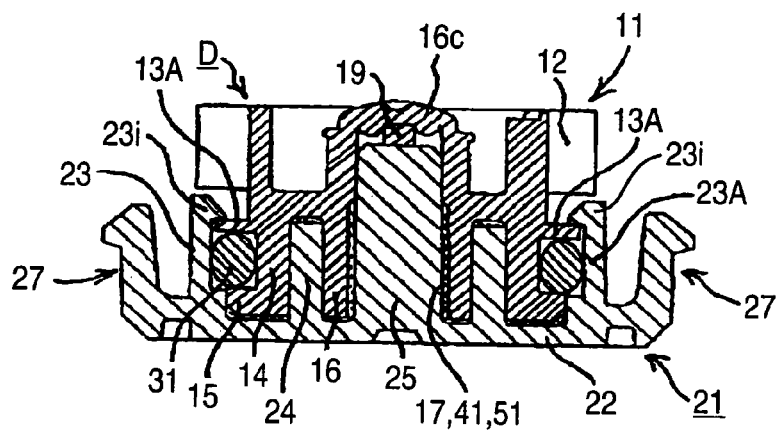
FIG. 7 is a front sectional view of a rotary damper according to a second embodiment of the present invention.

FIG. 7 is a front sectional view of a rotary damper according to a second embodiment of the present invention. A same symbol is attached to a same or corresponding portion in FIG. 7 as/to a portion in FIGS. 1 to 6, and the description of the portion is omitted.

A reference numeral 13A denotes a holding flange portion in FIG. 7, and a predetermined gap is formed between the holding flange portion and a gear portion 12, so that an engaging claw 23i of an outer cylinder wall 23A to be described later can go through the gap.

A reference numeral 23A denotes an outer cylinder wall which is formed in an outer frame of a bottom wall 22 as one structure. On the inner side of the outer cylinder wall 23A, engaging claws 23i which are protruded inward with the upper sides lowered inward and are engaged with the top face of the holding flange portion 13A of the driven rotation member 11 rotatably are provided in a circumferential direction at intervals of a predetermined distance therebetween, for example, 90 degree intervals.

The holding flange portion 13A and the engaging claw 23i construct an engaging portion in which a driving member 11 and a fixing and supporting member 21 are relatively rotatable.

Other portions of the rotary damper D according to the second embodiment of the invention have the same configurations as in the first embodiment.

Next, an example of assembly of the rotary damper D will be described.

At first, as shown in FIG. 1, a fixing and supporting member 21 is put on a workbench and a predetermined amount of a viscous fluid 51 is injected into a circular concave portion formed by an outer cylinder wall 23A and an inner cylinder wall 24.

The bottom of the driven rotation member 11 in which the O ring 31 is held in an outside of the outer cylinder wall 14 by the holding flange portions 13A and 15 is inserted into the fixing and supporting member 21 using the insertion of the center shaft 25 into the inner cylinder wall 16 as a guide.

As described above, when the bottom of the driven rotation member 11 is inserted into the fixing and supporting member 21, the viscous fluid 51 and air are compressed by the driven rotation member 11 and the fixing and supporting member 21 to move a space between the driven rotation member 11 and the fixing and supporting member 21 from outside to inside. Then, the viscous fluid and air go into a space between the inner cylinder wall 16 and the center shaft 25 through the groove 17.

Since the air moves faster than the viscous fluid 51, air does not remain in the accommodation portion 41 which is formed by the driven rotation member 11 and the fixing and supporting member 21.

As described above, when the bottom of the driven rotation member 11 is inserted into the fixing and supporting member 21, the holding flange portion 15, as shown in FIG. 7, is inserted into the inside of the outer cylinder wall 23A rotatably, and the O ring 31 seals between the outer cylinder wall 23A and the outer cylinder wall 14 while allowing the driven rotation member 11 and the fixing and supporting member 21 to be relatively rotatable. The engaging claw 23i is expanded to be open and is shrunk to be closed after passing by a holding flange portion 13A, so that the engaging claw 23i is engaged with the top face of the holding flange portion 13A to be rotatable.

The center shaft 25, as shown in FIG. 7, is inserted into the inner cylinder wall 16. When the center shaft 25 goes through the engaging protrusion 18 to collide with the welding regulating portion 19, the engaging protrusion 18 enters into the lock rotation groove 26, and the engaging protrusion 18 is engaged with the lock rotation groove 26.

As shown in FIG. 4, the heat tip H is heated by flowing a current in a status that the driven rotation member 11 is assembled to the fixing and supporting member 21, an upper end (aperture) of the inner cylinder wall 16 is welded to be closed by placing the upper end portion of the inner cylinder wall 16 in the concave portion c of the heat tip H as indicated by the alternate long and two short dashes line and pressing the heat tip down, and then, the heat tip is cooled and removed, and thereby the rotary damper D in a status shown in FIG. 7 is acquired. Then, the assembly is completed.

The attachment and operation of the rotary damper D in the second embodiment is the same as in the first embodiment, and thus the description thereof will be omitted.

The same advantages as in the first embodiment can be acquired in the second embodiment.

Since an engaging portion (a holding flange portion 13A and an engaging claw 23i) in which the driven rotation member 11 and the fixing and supporting member 21 can relatively rotate is provided an outer portion of the driven rotation member 11 and the fixing and supporting member 21, the driven rotation member 11 and the fixing and supporting member 21 can be formed using two face separation molding although a slider is used.

Figure 8:
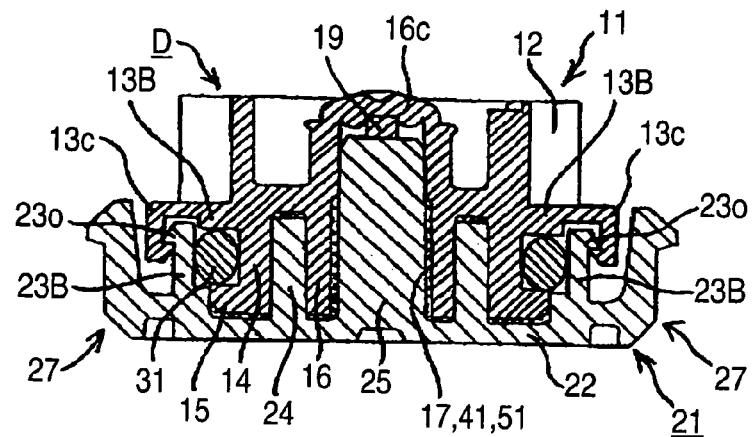
FIG. 8 is a front sectional view of a rotary damper according to a third embodiment of the present invention.

FIG. 8 is a front sectional view of a rotary damper according to a third embodiment of the present invention. A same symbol is attached to a same or corresponding portion in FIG. 8 as/to a portion in FIGS. 1 to 7, and the description of the portion is omitted.

In FIG. 8, a reference numeral 13B denotes a holding flange portion which is provided at the bottom side of a gear portion 12 as one structure. In the outer frame of the holding flange portion, four engaging claws 13c which extends outward and then, downward forming an "L" shape, the lower end on the inner side is an inclination which increases its opening width from the upper side to the lower side, and is engaged with a rotation lock portion 23o of the outer cylinder wall 23B to be described later are provided at predetermined intervals, for example, 90 degrees intervals in a circumference direction.

A reference numeral 23B denotes an outer cylinder wall formed in an outer frame of the bottom wall 22 as one structure. In the upper end on the outside of the outer cylinder wall, rotation lock portions 23o formed as an inclination in which the upper side is lowered in an outward direction to be protruded on the outer side and is engaged with the bottom face of the engaging claws 13c of the holding flange portion 13B of the driven rotation member 11 rotatably.

The engaging claw 13c and the rotation lock portion 23o construct an engaging portion in which the driven rotation member 11 and the fixing and supporting member 21 can relatively rotate.

Other portions of the rotary damper D according to the third embodiment of the invention have the same configurations as in the first embodiment.

The assembly of the rotary damper D in the third embodiment can be performed in the same manner as the second embodiment, and the attachment and operation of the rotary damper D in the third embodiment is the same as in the first embodiment, and thus the description thereof will be omitted.

The same advantages as in the second embodiment can be acquired in the third embodiment.

Figure 9:
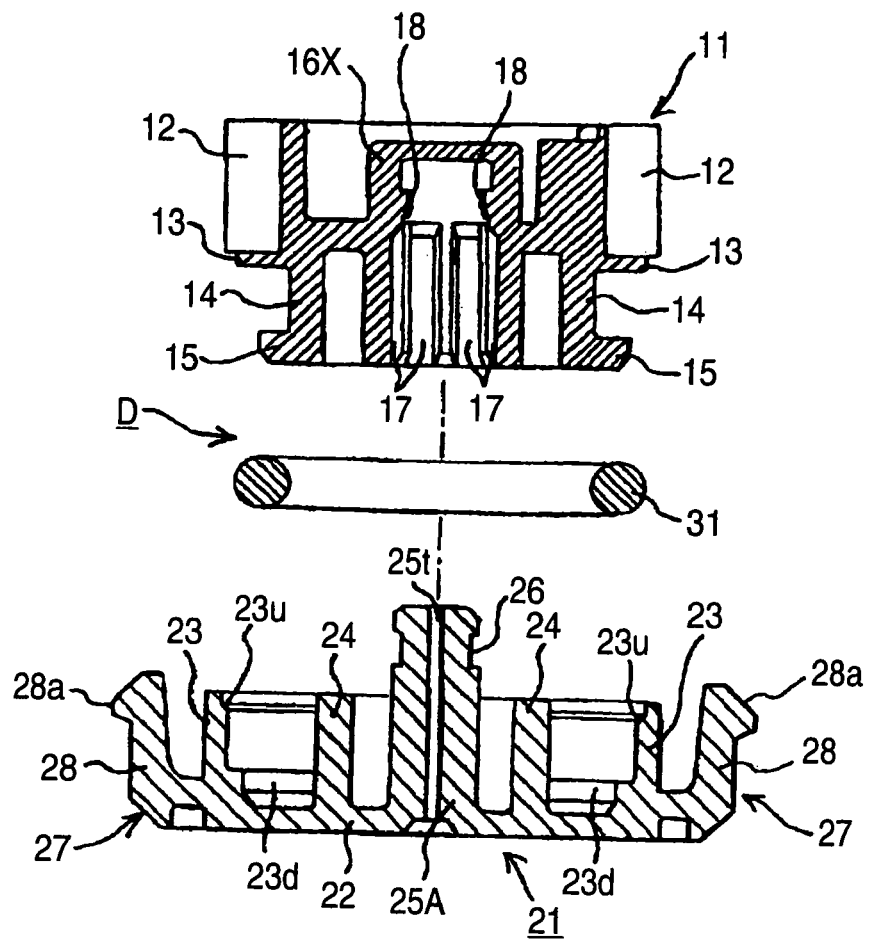
FIG. 9 is an exploded front sectional view of a rotary damper according to a fourth embodiment of the present invention.
Figure 10:
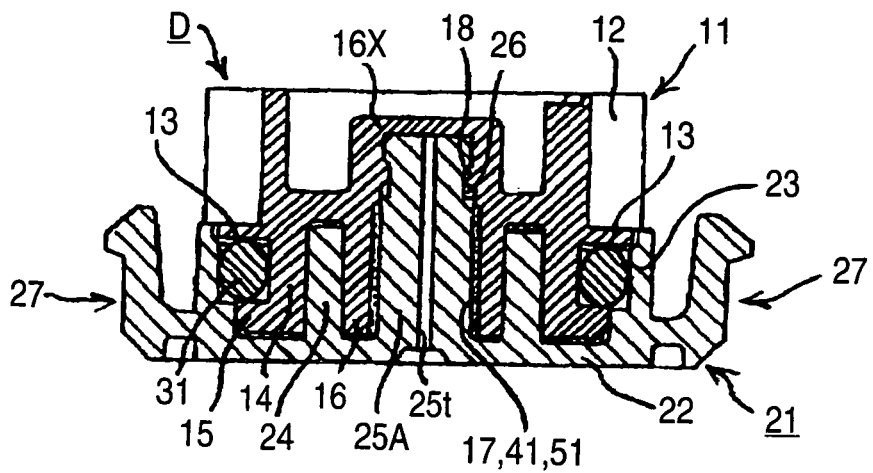
FIG. 10 is a front sectional view of a rotary damper which is fabricated by assembling components shown in FIG. 9.

FIG. 9 is an exploded front sectional view of rotary damper according to a fourth embodiment of the present invention, and FIG. 10 is a front sectional view of a rotary damper which is fabricated by assembling components shown in FIG. 9. A same symbol is attached to a same or corresponding portion in FIG. 9 as/to a portion in FIGS. 1 to 8, and the description of the portion is omitted.

In FIG. 9, a reference numeral 16X denotes an inner bottomed cylinder wall which is opened downward, and a groove 17 and an engaging protrusion 18 are provided inside the bottomed cylinder wall 16X.

A reference numeral 25A denotes a center shaft, and a through hole 25t is provided in the center of the center shaft 25A.

The height (length) of the center shaft 25A is configured such that the bottom of the inner bottomed cylinder wall 16X contacts an upper end face of the center shaft 25A to close the through hole 25t when the driven rotation member 11 is assembled to the fixing and supporting member 21.

Accordingly, the front end opening portion and the bottomed cylinder wall 16X as a closing member can be configured to serve as a gap regulating portion additionally.

The assembly of the rotary damper D in the fourth embodiment can be performed the same as in the first embodiment (the welding process using the heat tip H is excluded) as shown in FIG. 10.

The attachment and operation of the rotary damper D in the fourth embodiment is the same as in the first embodiment, and thus the description thereof will be omitted.

The same advantages as in the first embodiment can be acquired in the fourth embodiment.

Since a configuration in which the through hole 25t (opening) is closed when the driven rotation member 11 and the fixing and supporting member 21 are assembled is used, an operation for closing the through hole 25t (opening) is not required additionally, and the assembly can be performed efficiently.

In addition, since the inner bottomed cylinder wall 16X serves as a closing member additionally, two functions can be implemented in one component, and accordingly, the structure can be made simple compared with its functions.

Figure 11:
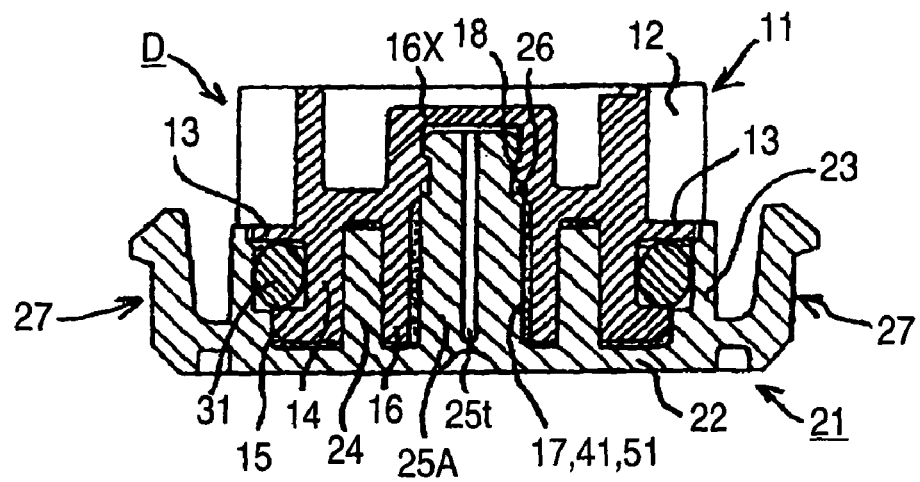
FIG. 11 is a front sectional view of a rotary damper according to a fifth embodiment of the present invention.

FIG. 11 is a front sectional view of a rotary damper according to a fifth embodiment of the present invention. A same symbol is attached to a same or corresponding portion in FIG. 11 as/to a portion in FIGS. 1 to 10, and the description of the portion is omitted.

A difference of the fifth embodiment from the fourth embodiment is in that the bottom of the inner bottomed cylinder wall 16X is spaced apart from the upper end face of the center shaft 25A in the sate where the driven rotation member 11 is assembled to the fixing and supporting member 21 and that an opening end (lower end) of the through hole 25*t* (opening) is closed by welding after the assembly of the driven rotation member 11 and the fixing and supporting member 21 thereby forming a close portion.

The same advantages as in the first embodiment can be acquired in the fifth embodiment.

Figure 12:
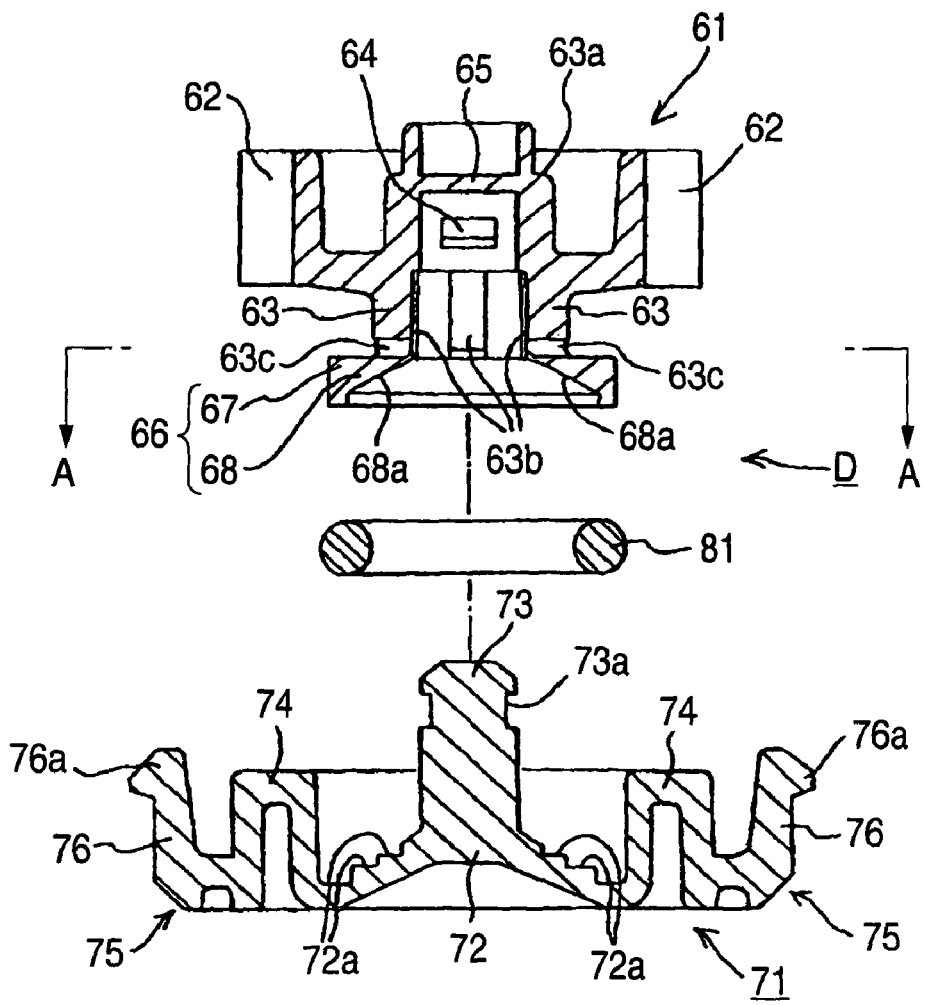
FIG. 12 is an exploded front sectional view of a rotary damper according to a sixth embodiment of the invention.
Figure 13:
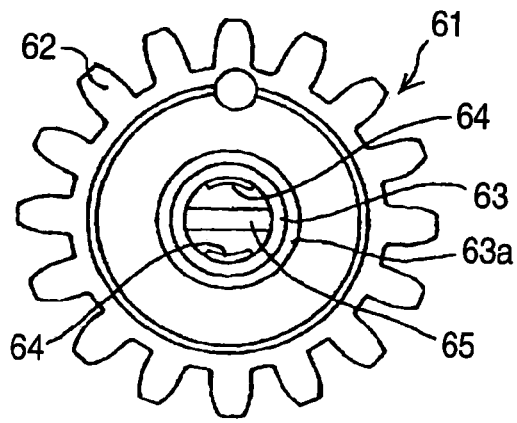
FIG. 13(a) is a plan view of a driven rotation member shown in FIG. 12.
FIG. 13(b) is a bottom view of the driven rotation member shown in FIG. 12.
FIG. 13(c) is a section view taken along the line A-A shown in FIG. 12.
Figure 13:
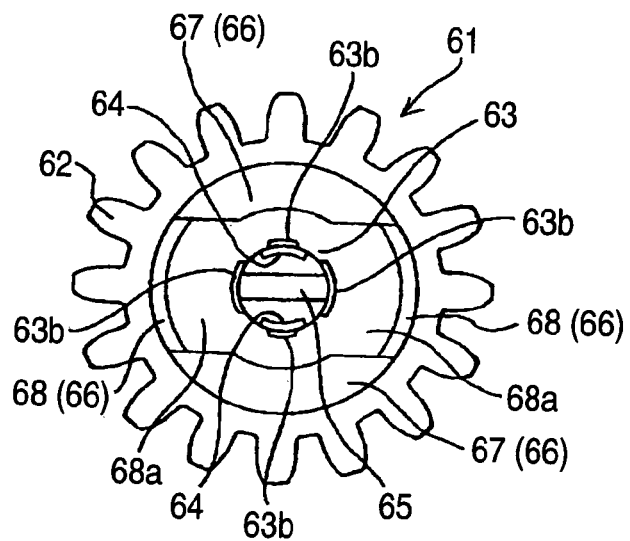
Figure 13:
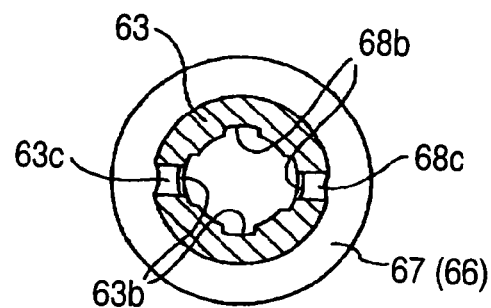
Figure 14:
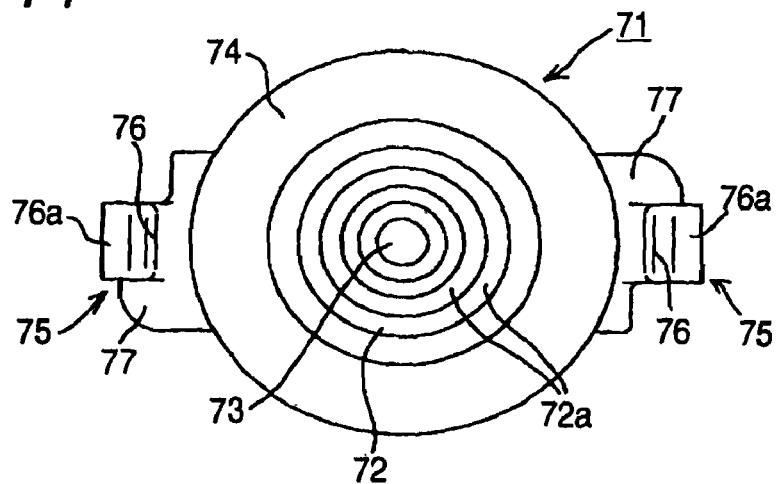
FIG. 14 is a plan view of a fixing and supporting member shown in FIG. 12.
Figure 15:
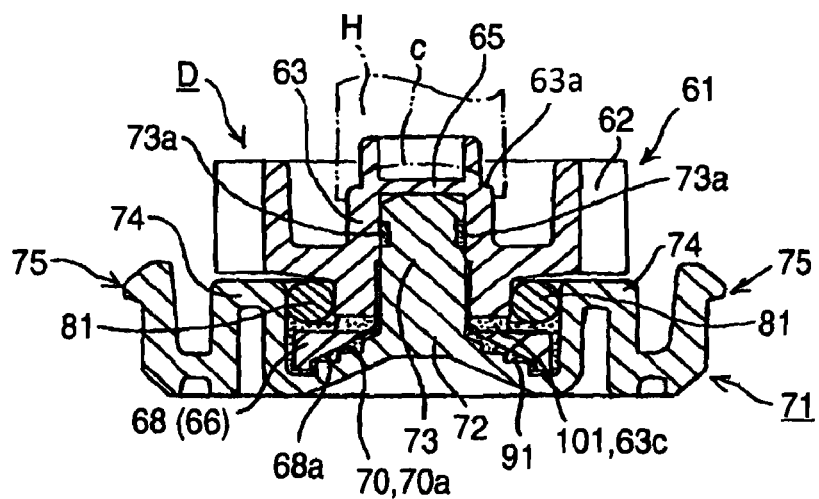
FIG. 15 is a front sectional view of a rotary damper during a fabrication process by assembling components shown in FIG. 12.
Figure 16:
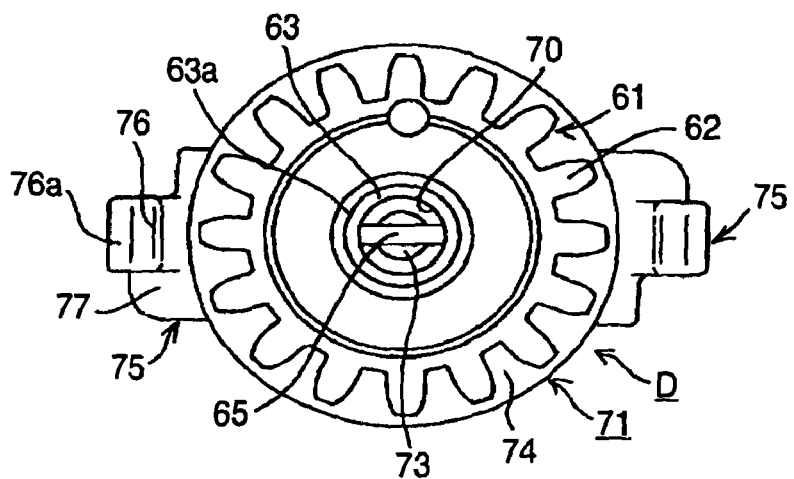
FIG. 16 is a plan view of a rotary damper during a fabrication process by assembling components shown in FIG. 12.
Figure 17:
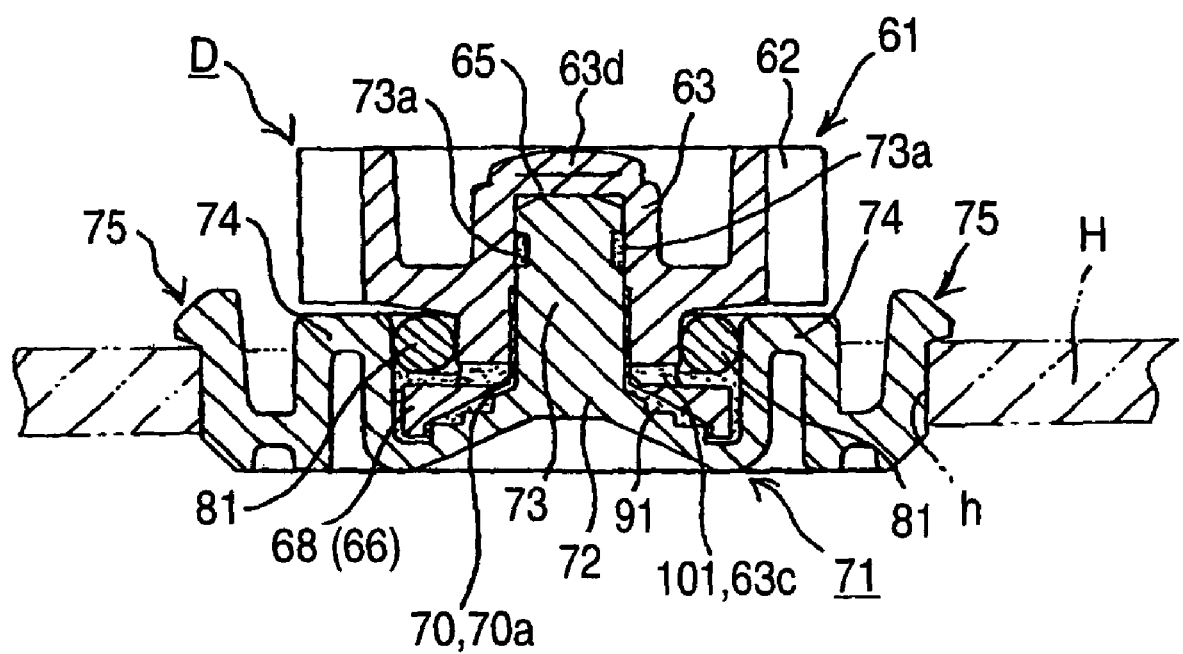
FIG. 17 is a front sectional view of a rotary damper which is fabricated by assembling components shown in FIG. 12 and is attached to an attachment target member.

FIG. 12 is an exploded front sectional view of a rotary damper according to a sixth embodiment of the invention. FIG. 13(*a*) is a plan view of a driven rotation member shown in FIG. 12. FIG. 13(*b*) is a bottom view of the driven rotation member shown in FIG. 12. FIG. 13(*c*) is a sectional view taken along the line A-A shown in FIG. 12. FIG. 14 is a plan view of a fixing and supporting member shown in FIG. 12. FIG. 15 is a front sectional view of a rotary damper during a fabrication process by assembling components shown in FIG. 12. FIG. 16 is a plan view of a rotary damper during a fabrication process by assembling the components shown in FIG. 12. FIG. 17 is a front sectional view of a rotary damper which is fabricated by assembling the components shown in FIG. 12 and is attached to an attachment target member.

In FIG. 12, a reference sign D denotes a rotary damper. The rotary damper includes a driven rotation member 61 (first member) made of a synthetic resin, a fixing and supporting member (second member) 71 called housing made of a synthetic resin which supports the driven rotation member 61 to be freely rotatable, an O ring 81 which is attached to the driven rotation member and suitably formed of a silicon rubber, EPDM (ethylene propylene diene rubber), or the like as a sealing member sealing an outer circumference end of a circular accommodation portion 91 (see FIG. 4 or 6) which is defined between the driven rotation member 61 and the fixing and supporting member 71 to allow relative rotation of the driven rotation member 61 and the fixing and supporting member 71, and a viscous fluid 101 (see FIG. 15 or FIG. 17) such as grease, silicon oil, or the like which is stored in the accommodation portion 91 (see FIG. 15 or FIG. 17) defined by the driven rotation member and the fixing and supporting member 71 and damps relative rotation of the driven rotation member 61 and the fixing and supporting member 71.

The driven rotation member 61 includes a gear portion 62 (see FIGS. 13(*a*) and 13(*b*)) as a rotation portion which is engaged with a driving member such as a gear or a rack, an inner cylinder wall (shaft portion) 63 (see FIGS. 13(*a*) to 13(*c*)) provided in the gear portion to penetrate the gear portion 62 with having the center of the gear portion 62 as a center, and a rotor portion 66 (see FIGS. 13(*b*) and 13(*c*)) which is provided in an lower end of the outer circumference of the inner cylinder wall 63 to face the gear portion 62, holds the O ring 81 to the gear portion 62 in the inner cylinder wall 63, and is inserted into an accommodation portion 91 in the shape of a circle, when viewed in a plane, concentric with the gear portion 62 (see FIG. 15 or FIG. 17).

A stair portion 63*a* (see FIG. 13(*a*)) which is formed thin and revolves outward is provided in the upper end portion of the inner cylinder wall 63.

In addition, in an inner circumference of the inner cylinder wall 63, for example, four grooves 63*b* (see FIGS. 13*b* and 13(*c*) also) having equal intervals of 90 degrees and extending from a lower end of the inner circumference wall to an approximately vertically center portion are formed. In addition, engaging protrusions 64 (see FIGS. 13(*a*) and 13(*b*) also) which are disposed in an upper side of the grooves 63*b*, and form a complementary engaging portion which can be rotated relatively with respect to a lock rotation groove 73*a* of the fixing and supporting member 71 are formed. In the engaging protrusions 64, an upper end is flat and a lower side is inclined to extend outward in a downward direction. As an example, the engaging protrusions 64 are disposed at intervals of 180 degrees therebetween. A welding regulating portion 65 (See also FIGS. 13(*a*) and 13(*b*)) locates over the upper sides of the engaging protrusions 64 and serves as a gap regulation portion for regulating a gap in a rotation shaft around which the driven rotation member 61 and the fixing and supporting member 71 rotate relatively when the driven rotation member 61 and the fixing and supporting member 71 are assembled and additionally regulating contacting a close portion 63*d* (see FIG. 17) which is formed by solidification of an upper end portion of a melted inner cylinder wall 63 to the center shaft 73 of the fixing and supporting member 71 when the upper end portion of the inner cylinder wall 63 is welded for closing the upper end portion of the melted inner cylinder wall 63.

Holes 63*c* (second path) (see FIG. 13(*c*)), for example, extending from an upper end portion of the rotor portion 66 in a radial direction are provided in the inner cylinder wall 63 at 180 degree intervals.

The rotor portion 66 includes a flange portion 67 (see FIGS. 13(*b*) and 13(*c*)) in the shape of a circle when viewed in a plane and a protrusion inclination portion 68 (see FIG. 13(*b*)) protruding in the shape of an I-cut under the flange portion 67.

The bottom 68*a* (upper wall side) of the protrusion inclination portion 68 is an inclination face (see FIG. 13(*b*)) increasing its height toward the center (inner cylinder wall 63).

The fixing and supporting member 71 includes a bottom wall 72 (see FIG. 14) in the shape of a circle when viewed in a plane, the bottom face in the inner side of which moves up toward its center, a center shaft 73 (see FIG. 14) which is provided in the center of the bottom wall 72 on the inner side and is inserted into an inner cylinder wall 63 (hole) of the driven rotation member 61, an outer cylinder wall 74 (see FIG. 14) which is provided in an outer circumference of the bottom wall 72, and an attachment portion 75 (see FIG. 14) provided, for example, at 180 degree intervals in the outer circumference of the outer cylinder wall 74.

A plurality of, for example, three (steps), concentric stair portions 72*a* having the center shaft 73 as its center are provided on the inner side of the bottom wall 72.

A chamfer process is performed on an upper end of the outer circumference of the center shaft 73. An engaging rotation groove 73*a* forming a complimentary engaging portion which can be rotated relatively with respect to the engaging protrusion 64 of the driven rotation member 61 and having a flat upper end is provided in the outer circumference of the center shaft corresponding to the height of the engaging protrusion 64 of the driven rotation member 61.

The attachment portion 75 includes a holding piece 76 (See FIG. 14) which extends outward from the outer cylinder wall 74 and then, extents upward and has a holding claw 76a on its upper end on the outer side and a holding protrusion 77 (see FIG. 14) extending outward from the outer cylinder wall 74 and having a gap of an attachment target member, for example, an attaching target plate E (see FIG. 17), which is held between the holding protrusion 77 and the holding claw 76a.

A viscous fluid 101 fills up the inside of the accommodation portion 91 which is defined by the driven rotation member 61, the fixing and supporting member 71, and an O ring 81 (see FIG. 15 or 17).

A hole through which the center shaft 73 of the fixing and supporting member 71 rotatably passes through is formed by the inner cylinder wall 63.

A first path 70 which enables the accommodation portion 91 which is filled up by the viscous fluid 101 to communicate with the outside of the fixing and supporting member 71 is formed by an inner side face of a bottom wall 72 constructing the fixing and supporting member 71 and an outer circumference face of the center shaft 73, and an inner circumference of the inner cylinder wall 63 constructing the driven rotation member 61 and the bottom face 68a of the protrusion inclination portion 68 (see FIG. 15 or 17).

The constriction portion 70a (see FIG. 15 or 17) of the first path 70 is formed by an edge (corner portion) protruding outward above a stair portion 72a provided in the lower wall 72 and a bottom face 68a of the protrusion inclination portion 68.

In FIG. 15, a reference sign H denotes a heat tip as a welding jig. A concave portion c which forms a part of a sphere accepting an upper side of the inner cylinder wall 63 of the driven rotation member 61 is formed in the lower end of the hit tip, and a protrusion which is protruded downward is formed in the center of the concave portion c.

Next, an example of assembly of the rotary damper D will be described.

At first, as shown in FIG. 12, a fixing and supporting member 71 is put on a workbench and predetermined amount of a viscous fluid 101 is injected into a concave portion defined by a bottom wall 72 and an outer cylinder wall 74.

The bottom of the driven rotation member 61 in which the O ring 81 is held in an outside of the inner cylinder wall 63 by the gear portion 62 and the rotor portion 66 is inserted into the fixing and supporting member 71 using the insertion of the center shaft 73 into the inner cylinder wall 63 as a guide.

As described above, when the bottom of the driven rotation member 61, that is, a portion positioned lower than the gear portion 62 is inserted into the fixing and supporting member 71, the viscous fluid 101 and air pass through the first path 70 between the bottom wall 72 and the rotor portion 66 to go into a space between the center shaft 73 and the inner cylinder wall 63 and also lift between the outer cylinder wall 74 and the rotor portion 66, pass under of the O ring 81, and go into the first path 70 between the center shaft 73 and the inner cylinder wall 63 from a hole (second path) 63c.

As described above, when the viscous fluid 101 and the air move, since the air moves faster than the viscous fluid 101, the air does not remain in the accommodation portion 91 which is formed by the driven rotation member 61, the fixing and supporting member 71, and the O ring 81.

In addition, since a constriction portion 70a is provided in the first path 70, the speed of the viscous fluid 101 moving through the first path 70 is suppressed by the constriction portion 70a, and accordingly, it becomes easy to discharge the air outside the accommodation portion 91 by increasing the moving speed of the air compared with that of the viscous fluid 101.

In addition, since a space formed by the outer cylinder wall 74, the inner cylinder wall 63, and the rotor portion 66, that is, a space under the O ring 81 in the accommodation portion 91 communicates with the first path 70 through the hole (second path) 63c, the air does not remain inside the accommodation portion 91.

As described above, when the bottom of the driven rotation member 61 is inserted into the fixing and supporting member 71, the rotor portion 66, as shown in FIG. 15, is inserted into the inside of the outer cylinder wall 74 rotatably, and the O ring 81 seals between the outer cylinder wall 74 and the inner cylinder wall 63 while allowing the driven rotation member 61 and the fixing and supporting member 71 to be relatively rotatable.

The center shaft 73 is placed inside the inner cylinder wall 63, and when the center shaft 73 passes through the engaging protrusion 64 to collide with the welding regulating portion 65, the engaging protrusion 64 is inserted into the lock rotation groove 73a to be engaged with the lock rotation groove 73a.

As shown in FIG. 15, the heat tip H is heated by flowing a current in a status that the driven rotation member 61 is assembled to the fixing and supporting member 71, an upper end of the inner cylinder wall 63 is melted to be a close portion 63d by placing the upper end portion of the inner cylinder wall 63 in the concave portion c of the heat tip H as indicated by the alternate long and two short dashes line and pressing the heat tip down, the first path 70 is closed, and then, the heat tip is cooled and removed, and thereby the rotary damper D in a status shown in FIG. 17 is acquired. Then, the assembly is completed.

Next, an example of the attachment of the rotary damper D will be described.

As shown in FIG. 17, the rotary damper D is attached to the attached plate E by pinching the attached plate E between the holding claw 76a and the holding protrusion 77 using a hole which is provided in the attachment plate E, that is a hole having the same circular shape as the outer cylinder wall 74 of the fixing and supporting member 71 having a notch into which the attachment portion 75 can be inserted at opposing positions of an outer circumference at 180 degrees.

Next, the operation of the rotary damper will be described.

At first, when the driven rotation member 61 is rotated by the rotation of the gear portion 62 which is interlocked with a gear, a rack, or the like, the rotation of the driven rotation member 61 is damped by a viscous resistance and a shearing resistance of the viscous fluid 101 interposed between the driven rotation member 61 and the fixing and supporting member 71.

Accordingly, the gear portion 62 of the driven rotation member 61 damps the rotation or movement of the gear, the rack, or the like which is interlocked with the driven rotation member, so that the gear, the rack, or the like is slowly rotated or moved.

As described above, according to a sixth embodiment of the present invention, since a first path 70 is provided between the center shaft 73 and the inner circumference of the inner cylinder wall 63 while allowing the accommodation portion 91 to communicate with its outside and a hole (second path) 63c which allows the bottom side of the O ring 81 inside the accommodation portion 91 to communicate with the first path 70 is provided in the driven rotation member 61, the air located under the O ring 81 inside the accommodation portion 91 in which air can be easily collected can be discharged through the hole (second path) 63c and the first path 70 outside the accommodation portion 91.

Accordingly, the non-uniformity of damping torque can be reduced by decreasing the remaining air inside the accommodation portion 91.

In addition, since the first path 70 that allows the accommodation portion 91 defined between the driven rotation member 61 and the fixing and supporting member 71 to communicate with its outside and a constriction portion 70a is provided in the first path 70, the speed of the viscous liquid 101 moving through the first path 70 is reduced by the constriction portion 70a. Accordingly, the air can be easily discharged outside the accommodation portion 91 by increasing the relative moving speed of the air with respect to that of the viscous fluid.

Accordingly, the non-uniformity of damping torque is reduced by reducing the air remaining in the accommodation portion 91.

In addition, since a plurality of the constriction portions 70a are provided in the first flow 70 in a direction that the viscous liquid 101 flows, the speed of the viscous liquid 101 moving through the first path 70 is reduced further by the plurality of constriction portions 70a. Accordingly, the air can be more easily discharged outside the accommodation portion 91 by further increasing the relative moving speed of the air with respect to that of the viscous fluid 101.

Accordingly, the non-uniformity of damping torque can be reduced more by further decreasing the remaining air inside the accommodation portion 91.

In addition, since the top face (bottom face 68a of the protrusion inclination portion 68) forming the first path 70 is formed to be an inclination increasing its height, the air is lifted along the top face, and accordingly, it becomes much easier to discharge the air outside the accommodation portion 91.

Accordingly, the non-uniformity of damping torque can be reduced much more by even further decreasing the remaining air inside the accommodation portion 91.

In addition, since the first path 70 is closed after the assembly, an outlet of the viscous liquid 101 is removed, and accordingly, the leakage of the viscous liquid 101 outside the accommodation portion 91 can be prevented.

In the embodiments described above, when the driven rotation member 11 or 61 and the fixing and supporting member 21 or 71 are assembled, an example of a configuration in which the gap regulating portion (welding regulating portion 19 or 35) for regulating a gap between the driven rotation member 11 or 61 and the fixing and supporting member 21 or 71 in a direction of the rotation shaft around which the driven rotation member 11 or 61 and the fixing and supporting member 21 or 71 relatively rotate is provided to the driven rotation member 11 or 61 is represented, but as shown in FIGS. 4 and 6, an upper stair portion 23u of the outer cylinder wall 23 which the holding flange portion 13 contacts may be configured as the gap regulating portion.

In addition, although an example of a complimentary engaging portion in which an engaging protrusion 18 or 64 is provided in the inner cylinder wall 16 or 63 and a lock rotation groove 26 or 73a is provided in the center shaft 25 or 73 is represented, the complimentary engaging portion may have a configuration in which a lock rotation groove is provided in the inner cylinder wall and an engaging protrusion is provided in the center shaft.

In addition, although an example in which the sealing member is an O ring 31 or 81 is represented, but the sealing member may have a concave portion and a convex portion which can relatively rotate and the convex portion may be two-color molded using soft material.

In addition, the through hole 25t in the fifth embodiment may be provided in the center shaft 25 or 73 in one of the first to fourth and sixth embodiments, and the through hole 25t may be closed by welding after being assembled.

When an amount of the flexibility of the engaging claw 23i is required, slits corresponding to left/right sides of the engaging claw 23i may be provided in an upper portion of the outer cylinder wall 23A which the O ring 31 seals by pressing, so that a part of the outer cylinder wall 23 is bent.

In addition, although the engaging portion has a configurations in which an engaging protrusion 18 or 64 and a lock rotation groove 26 or 73a are included (the first, fourth, fifth, and sixth embodiments), a holding flange portion 13A and an engaging claw 23i are included (the second embodiment), or an engaging claw 13c and a rotation lock portion 23o are included (the third embodiment) is represented, any one of the engaging portions may be used.

In addition, although an example in which a second path (hole 63c) which allows the bottom of the O ring 81 of the accommodation portion 91 to communicate with the first path 70 is provided in a part of the inner cylinder wall 63 above the rotor portion 66 is represented, the second path may be provided to extend to the upper end portion of the rotor portion 66 or be provided in the upper end of the rotor portion 66.

In addition, although an example in which the rotor portion 66 includes a flange portion 67 and a protrusion inclination portion 68 and the bottom face 68a of the protrusion inclination portion 68 is configured to be an inclination face is represented, the whole rotor portion 66 may be the protrusion inclination portion and the bottom face of the protrusion inclination portion may be a cone face increasing its height toward a center (inner cylinder wall 63).

In addition, although an example in which the upper end portion of the inner cylinder wall 63 is closed, the upper end portion of the inner cylinder wall 63 may not be closed when the viscous fluid 101 does not leak from the first path 70 to the outside of the fixing and supporting member 71.

In addition, although an example in which the constriction portion 70a of the first path 70 is provided in the stair portion 12a of the bottom wall 72 is represented, the constriction portion may be provided in the first path 70 by configuring the inner bottom face of the bottom wall 72 to be a cone face and providing a stair portion in the protrusion inclination portion 68.

In addition, the sixth embodiment of the present invention may be applied to a general rotary damper including a fixing and supporting member main body having a concave portion in the shape of a cylinder, a fixing and supporting member having a concave portion in the shape of a cylinder which has a cap closing an opening face of the fixing and supporting member and having its periphery sealed to the fixing and supporting member main body to be attached, a viscous fluid which is filled in the fixing and supporting member, a driven rotation member in which a rotor portion is inserted into the viscous fluid inside the fixing and supporting member rotatably and a center shaft is extruded outward (outside the fixing and supporting member) from the center of the cap and an O ring which prevents the leakage of the viscous liquid from between the outside of the center shaft (driven rotation member) and the inside of the cap (fixing and supporting member).

As described above, when the sixth embodiment of the present invention is applied to the general rotary damper, a first path having an L-shaped or T-shaped longitudinal section face which is formed by a horizontal hole (a hole in right/left directions corresponding to the second path 63c) and a vertical hole (a hole in up/down directions) disposed in a side upper than a horizontal hole of a hole (a hole in the up/down directions) of the inner cylinder wall 63 and communicating with the horizontal hole is provided as a center shaft, and the first path is closed when or after being assembled.

INDUSTRIAL APPLICABILITY

A rotary damper of the invention can be easily assembled by decreasing the remaining air in the accommodation portion and reducing the non-uniformity of damping torque (keeping the precision of the torque constant).

The invention claimed is:

1. A rotary damper comprising:
a driven rotation member integrally formed with a rotation portion engagable with a driving member;
a fixing and supporting member that holds the driven rotation member rotatably;
an accommodation portion that is defined between the fixing and supporting member and the driven rotation member, and
a viscous fluid that is stored in the accommodation portion and damps a relative rotation of the driven rotation member and the fixing and supporting member, wherein
a center shaft is provided in the center of the fixing and supporting member,
a hole into which the center shaft is rotatably inserted is provided in the driven rotation member,
a seal member that prevents a leakage of the viscous fluid from a portion between the driven rotation member and the fixing and supporting member is provided,
a first path is provided between the center shaft and a surrounding face forming the hole, and
a second path that allows a bottom side of the seal member inside the accommodation portion to communicate with the first path is provided in the driven rotation member and extends in a radial direction.

2. The rotary damper according to claim 1, wherein the first path is closed after the driven rotation member and the fixing and supporting member are assembled.

3. A rotary damper comprising:
a driven rotation member integrally formed with a rotation portion engagable with a driving member;
a fixing and supporting member that holds the driven rotation member rotatably;
an accommodation portion that is defined between the fixing and supporting member and the driven rotation member, and
a viscous fluid that is stored in the accommodation portion and damps a relative rotation of the driven rotation member and the fixing and supporting member, wherein
a center shaft is provided in a center of the fixing and supporting member,
a hole into which the center shaft is rotatably inserted is provided in the driven rotation member,
a seal member that prevents a leakage of the viscous fluid from a portion between the driven rotation member and the fixing and supporting member is provided,
a first path is provided between the driven rotation member and the fixing and supporting member,
a second path that allows a bottom side of the seal member inside the accommodation portion to communicate with the first path is provided in the driven rotation member and extends in a radial direction, and
a constriction portion is provided in the first path.

4. The rotary damper according to claim 3, wherein a plurality of the constriction portions are provided in the first path in a direction that the viscous fluid flows.

5. The rotary damper according to claim 3, wherein an upper wall face forming the first path is an upward inclining face.

6. The rotary damper according to claim 3, wherein the first path is closed after the driven rotation member and the fixing and supporting member are assembled.

7. A rotary damper comprising:
a first member;
a second member that holds the first member rotatably;
an accommodation portion that is defined between the first member and the second member;
a viscous fluid that is stored in the accommodation portion and damps a rotation of the first member with respect to the second member;
a seal member that seals the accommodation portion from atmosphere in a state where the first member is rotatable with respect to the second member; and
a close portion that is provided in at least one of the first member and the second member, and is formed by closing an aperture, which communicates the accommodation portion with atmosphere during assembly processing of the first member and the second member; wherein
a first path through which the accommodation portion communicates with the close portion is provided between the first member and the second member, and
a second path that allows a bottom side of the seal member inside the accommodation portion to communicate with the first path extends in a radial direction.

8. The rotary damper according to claim 7, wherein the aperture is provided at a front end of the first member.

9. The rotary damper according to claim 8, wherein the close portion is formed by welding the aperture provided at a front end of the first member.

10. The rotary damper according to claim 8, wherein the close portion is formed by assembling the first member and the second member.

11. The rotary damper according to claim 7, wherein the aperture is provided at a bottom of the second member.

12. The rotary damper according to claim 11, wherein the close portion is formed by welding the aperture provided at a bottom of the second member.

13. The rotary damper according to claim 7, wherein at least one of the first member and the second member includes a gap regulating portion for regulating a gap in a direction of a rotation shaft around which the first member rotates with respect to the second member when the first member and the second member are assembled.

14. The rotary damper according to claim 7, wherein
the second member includes a center shaft,
the first member includes a cylinder-shaped portion having a hollow portion into which the center shaft is inserted, and having a welding regulating portion for regulating contacting a melted portion of the cylinder-shaped portion to the center shaft.

15. The rotary damper according to claim 14, wherein the welding regulating portion additionally serves as the gap regulating portion.

16. The rotary damper according to claim 7, wherein
the second member includes a center shaft,
the first member includes a cylinder-shaped portion having a hollow portion into which the center shaft is inserted, and wherein
a complementary engaging portion for regulating an displacement of the first member and the second member in a direction of a rotation shaft around which the first member rotates with respect to the second member and allowing the first member to rotate with respect to the second member is provided between an inner circumference of the cylinder-shaped portion and an outer circumference of the center shaft.

17. The rotary damper according to claim 7, wherein
at least one of the first member and the second member includes a claw portion for regulating an displacement of the first member and the second member in a direction of a rotation shaft around which the first member rotates with respect to the second member and allowing the first member to rotate with respect to the second member.

18. The rotary damper according to claim 7, wherein
the second member includes a center shaft,
the first member includes a cylinder-shaped portion having a hollow portion into which the center shaft is inserted, wherein
the first path is provided between the center shaft and the cylinder-shaped portion.

19. The rotary damper according to claim 18, wherein the first member includes the second path.

20. The rotary damper according to claim 7, wherein
a constriction portion is provided in the first path.

21. The rotary damper according to claim 20, wherein a plurality of the constriction portions are provided in the first path in a direction that the viscous fluid flows.

22. The rotary damper according to claim 20, wherein an upper wall face forming the first path is an upward inclining face.

* * * * *